Figure 1:
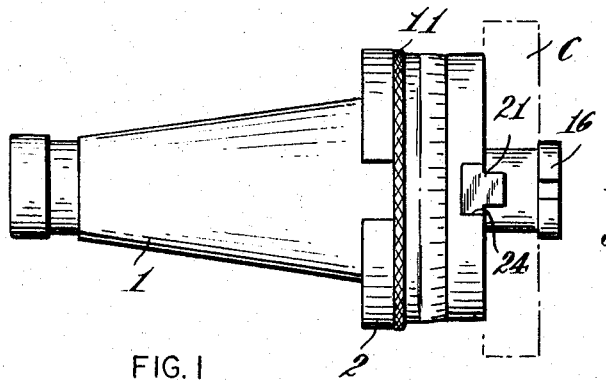

Sept. 5, 1967   T. V. WILLIAMS   3,339,458
ROTARY-CUTTER TOOLS
Original Filed Oct. 19, 1964

INVENTOR.
Thurston V. Williams
BY
Roberts, Cushman & Grover
ATT'YS

United States Patent Office 3,339,458
Patented Sept. 5, 1967

3,339,458
ROTARY-CUTTER TOOLS
Thurston V. Williams, Wilton, N.H., assignor to The O.K. Tool Company, Inc., Milford, N.H., a corporation of New Hampshire
Continuation of abandoned application Ser. No. 404,797, Oct. 19, 1964. This application Sept. 12, 1966, Ser. No. 589,151
6 Claims. (Cl. 90—11)

This is a continuation of application Ser. No. 404,797, filed Oct. 19, 1964, and now abandoned.

In milling cutters and other rotary-cutter tools it is customary to have the smaller forward end of the arbor extend through the bore of the cutter and to prevent the rotation of the cutter on the arbor by means of keys having their rearward ends fitting in recesses in the front face of the arbor and their forward ends fitting in a groove in the rear face of the cutter. Different cutters have bores of different diameters and grooves of different widths. Consequently prior tools have not been adaptable to different cutters quickly and inexpensively, and it has not been possible to effect axial adjustment of the cutters quickly and easily.

Objects of the present invention are to provide a tool which can be adapted to different cutters quickly and economically and in which axial adjustment of the cutters can be made quickly and with precision.

According to the present invention the tool comprises an arbor having a front face and a cylindrical extension beyond the front face, a collar fitting over the extension and keyed thereto, a key fast to the front end of the collar and projecting forwardly therefrom, and a micrometer adjuster between the aforesaid face and collar to adjust the collar axially of the arbor. Preferably the diameter of the rear end of the collar is less than that of the front end and the micrometer adjuster surrounds the rear end.

The invention also involves a tool comprising an arbor, a cutter, means for mounting the cutter on the arbor, the means having a recess in its front face and the cutter having a groove in its rear face, a key having a rear portion to fit in the aforesaid recess and a front portion to fit in the aforesaid groove, the aforesaid portions having different widths to accommodate a cutter having a groove whose width is different from that of the arbor recess. For use in a tool of this kind the invention comprises a set of keys each having a rear portion to fit in the aforesaid recess and a front portion to fit in the aforesaid groove, the rear portions having the same width to fit a recess of predetermined width and the front portions having different widths to fit cutter grooves of different widths.

The invention also involves a tool comprising an arbor having an axial bore in its forward end, the front end of the bore being larger than the rear end, a set of bushings each having a rear portion to fit the front end and a front portion to fit into a cutter, the rear portions having the same diameter as the aforesaid front end and the front portions having different diameters to fit cutters of different internal diameters, and a screw extending through the aforesaid front end and threading into the aforesaid rear end, the screw having a head engaging the forward face of the cutter to hold the cutter in position. The diameter of the front portion of one bushing may be less than the diameter of its rear portion.

Figure 2:
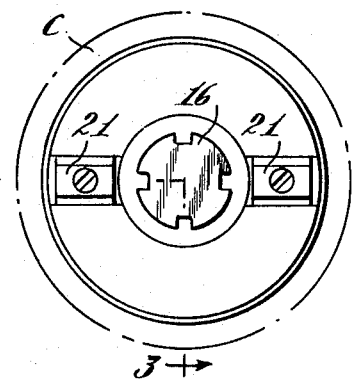
Figure 3:
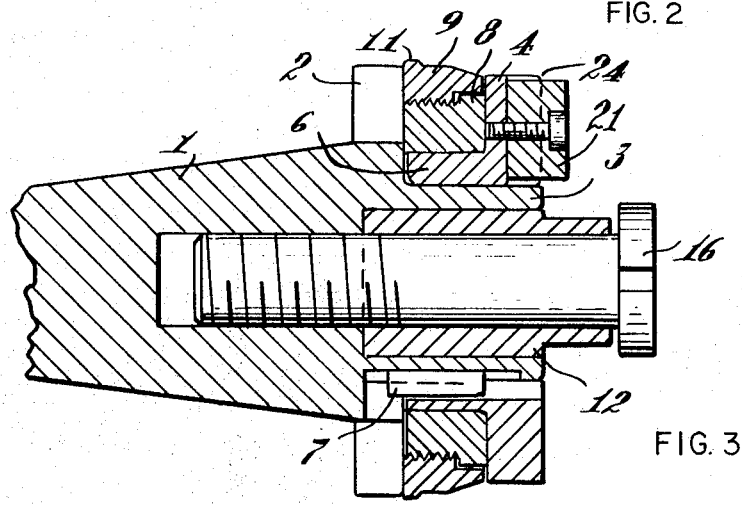
Figure 4:
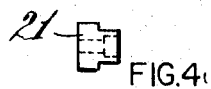
Figure 5:
Figure 6:
Figure 4A:
Figure 5A:
Figure 6A:
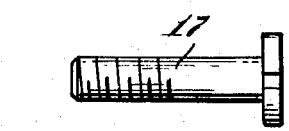
Figure 4B:
Figure 5B:
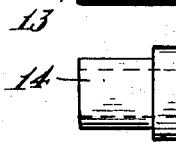
Figure 6B:
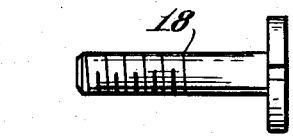

For the purpose of illustration a typical embodiment of the invention is shown in the accompanying drawings in which
FIG. 1 is a side view of an arbor;
FIG. 2 is a front end view;

FIG. 3 is a section on line 3—3 of FIG. 2;
FIGS. 4, 4a and 4b are side views of a set of interchangeable keys;
FIGS. 5, 5a, and 5b are side views of a set of interchangeable bushings; and
FIGS. 6, 6a, and 6b are side views of a set of interchangeable screws.

The particular embodiment of the invention chosen for the purpose of illustration comprises an arbor 1 having the usual flange 2 and a cylindrical extension 3. Fitting over the extension is a collar having a front end 4 and a rear end 6 of less diameter, the collar being keyed to the arbor by a key 7. Surrounding the rear part of the collar is a micrometer adjuster comprising inner and outer parts 8 and 9 threaded together, the outer part having a knurled surface 11 to facilitate rotation relative to the inner part. By turning the outer part 9 in the direction to thread it off the inner part 8 the collar 4–6 is pushed to the right (FIG. 3), whereby the cutter C, shown in broken lines in FIGS. 1 and 2, is moved to the right (FIG. 1). Telescoping into the front end of the arbor is a bushing 12 which projects beyond the end of the extension to receive the cutter. As shown in FIG. 5 a set of bushings is provided, the rear ends of the bushings having the same diameter as the internal diameter of the extension 3 and the forward ends having different diameters to receive cutters which have different internal diameters. The front portion of bushing 12 is smaller than the rear portion, the two diameters of bushing 13 are equal and the front portion of bushing 14 is larger than the rear portion.

The cutter C is held on the forward end of a bushing by means of a screw 16, the head of which is larger than the front portion of the corresponding bushing so as to engage the forward face of the cutter and hold it in position. FIG. 6 shows three screws 16, 17 and 18 to be used with the bushings 12, 13 and 14 respectively. However the screw 18 can be used with any of the bushings because its head is larger than the forward end of the larger bushing 14.

To prevent rotation of the cutter relatively to the arbor, keys 21, 22 and 23 are provided, each key having a rear portion fitting in a recess 24 in the forward face of the collar 4 and a forward portion to fit in the usual groove on the rear face of the cutter. In the set of keys shown in FIG. 4 the widths of the rear portions of the keys are equal and the widths of the forward portions differ to fit cutter grooves of different widths. In key 21 the width of the front portion is less than that of the rear portion; in key 22 the width of the front portion is larger; and in key 23 the widths of the two portions are equal.

From the foregoing it will be evident that merely by interchanging keys and bushings cutters of different kinds can be accommodated.

It should be understood that the present disclosure is for the purpose of illustration only and that this invention includes all modifications and equivalents which fall within the scope of the appended claims.

I claim:
1. A tool comprising an arbor having a front face and a cylindrical extension beyond said face, a collar fitting over said extension, the collar having a shoulder opposite said face with a space therebetween, a micrometer adjuster in said space, means for clamping a cutter against the front of said collar, and key means for keying said collar to said extension and cutter so that torque may be transmitted from the arbor to the cutter wholly through the collar, whereby the micrometer may be clamped between said face and shoulder without being keyed to any part of the tool.

2. A tool according to claim 1 wherein the diameter of the rear end of the collar is less than that of said front end and the micrometer adjuster surrounds said rear end.

3. A tool according to claim 1 wherein said collar has a recess in its front face and said key means comprises a key having a rear portion to fit said recess and a front portion to fit a groove in the cutter, said portions having different widths to accommodate a cutter whose groove has a width different from that of said recess.

4. For use in a tool according to claim 3 a set of keys each having a rear portion to fit in said recess and a front portion to fit in a cutter groove, said rear portions having the same width to fit a recess of predetermined width and said front portions having different widths to fit cutter grooves of different widths.

5. A tool according to claim 1 wherein said arbor has an axial bore in its forward end, the front end of the bore being larger than the rear end and said clamping means comprises a set of bushings each having a rear portion to fit said front end and a front portion to fit into a cutter, said rear portions having the same diameter as said front end and said front portions having different diameters to fit cutters of different internal diameters, and a screw extending through said front end and threading into said rear end, said screw having a head engaging the forward face of the cutter to hold the cutter in position.

6. A tool according to claim 5 wherein the diameter of the front portion of one bushing is less than the diameter of its rear portion.

No references cited.

WILLIAM W. DYER, Jr., *Primary Examiner.*

G. A. DOST, *Examiner.*